Dec. 2, 1941.  G. CARSON  2,264,508
AUTOMATIC MACHINE WORKPIECE CLAMPING MECHANISM
Filed Oct. 7, 1940  2 Sheets-Sheet 1

INVENTOR
George Carson,
BY
Bean, Brooks, Buckley & Bean ATTORNEYS

Dec. 2, 1941.                G. CARSON                    2,264,508
            AUTOMATIC MACHINE WORKPIECE CLAMPING MECHANISM
                    Filed Oct. 7, 1940          2 Sheets-Sheet 2
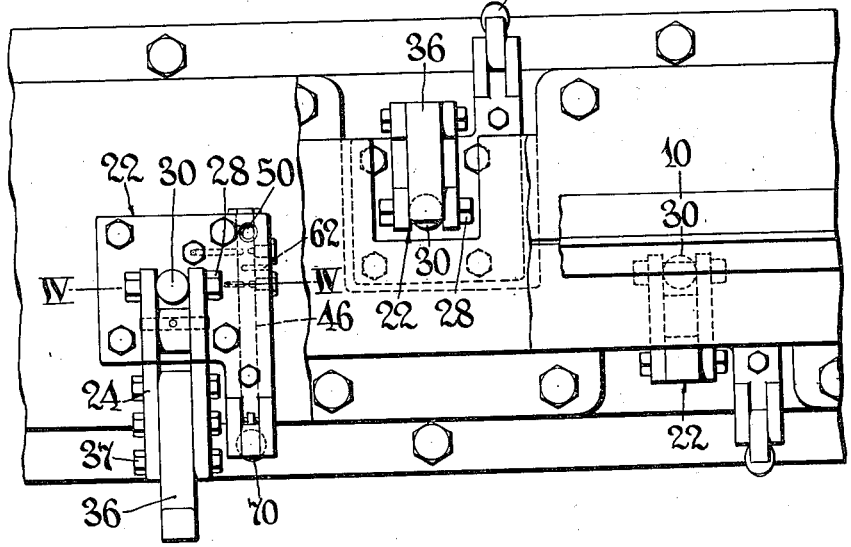
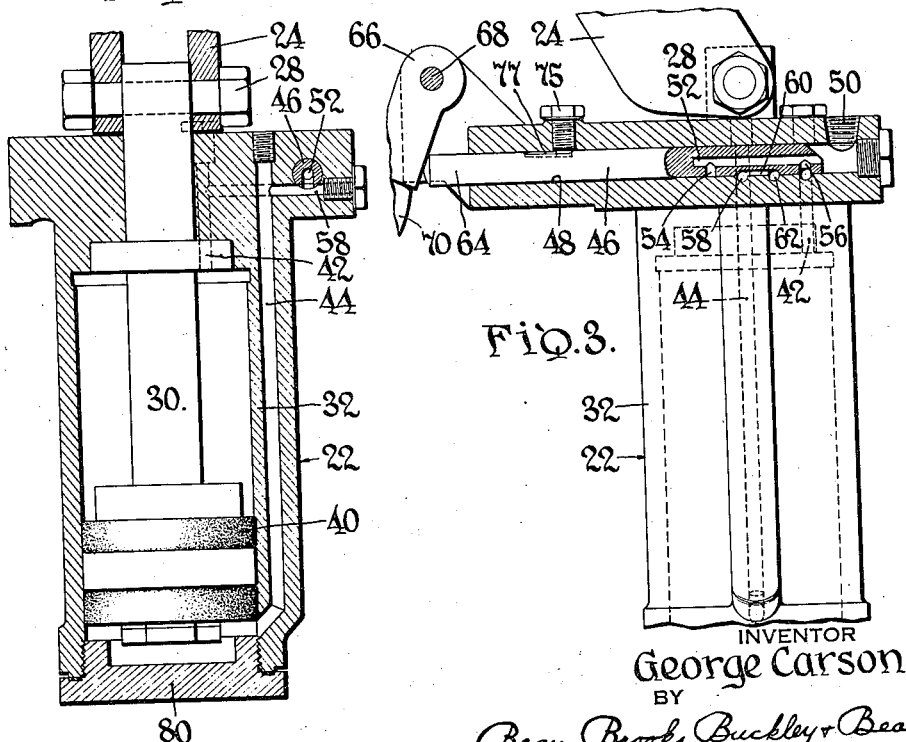

Patented Dec. 2, 1941

2,264,508

UNITED STATES PATENT OFFICE 2,264,508

AUTOMATIC MACHINE WORKPIECE CLAMPING MECHANISM

George Carson, Buffalo, N. Y., assignor to Bell Aircraft Corporation, Buffalo, N. Y.

Application October 7, 1940, Serial No. 360,008

6 Claims. (Cl. 90—59)

This invention relates to automatic machine tools, and more particularly to work piece holding means for use in connection with milling machines, or the like.

One of the objects of the invention is to provide an improved work piece holding mechanism which is adapted for use in conjunction with elongate work pieces which require to be firmly clamped at intervals longitudinally thereof upon a machine bed by means of clamping elements adapted to move sequentially out of the path of the machine tool as it progresses relative to the work piece. Other objects and advantages of the invention will appear hereinafter in the specification.

In the drawings:

Fig. 2 is a fragmentary plan thereof, with portions broken away to show the actuating elements thereof;

Fig. 3 is a fragmentary transverse vertical section through a clamping device actuating portion; and Fig. 4 is a vertical section taken substantially along line IV—IV of Fig. 2.

Figure 1:
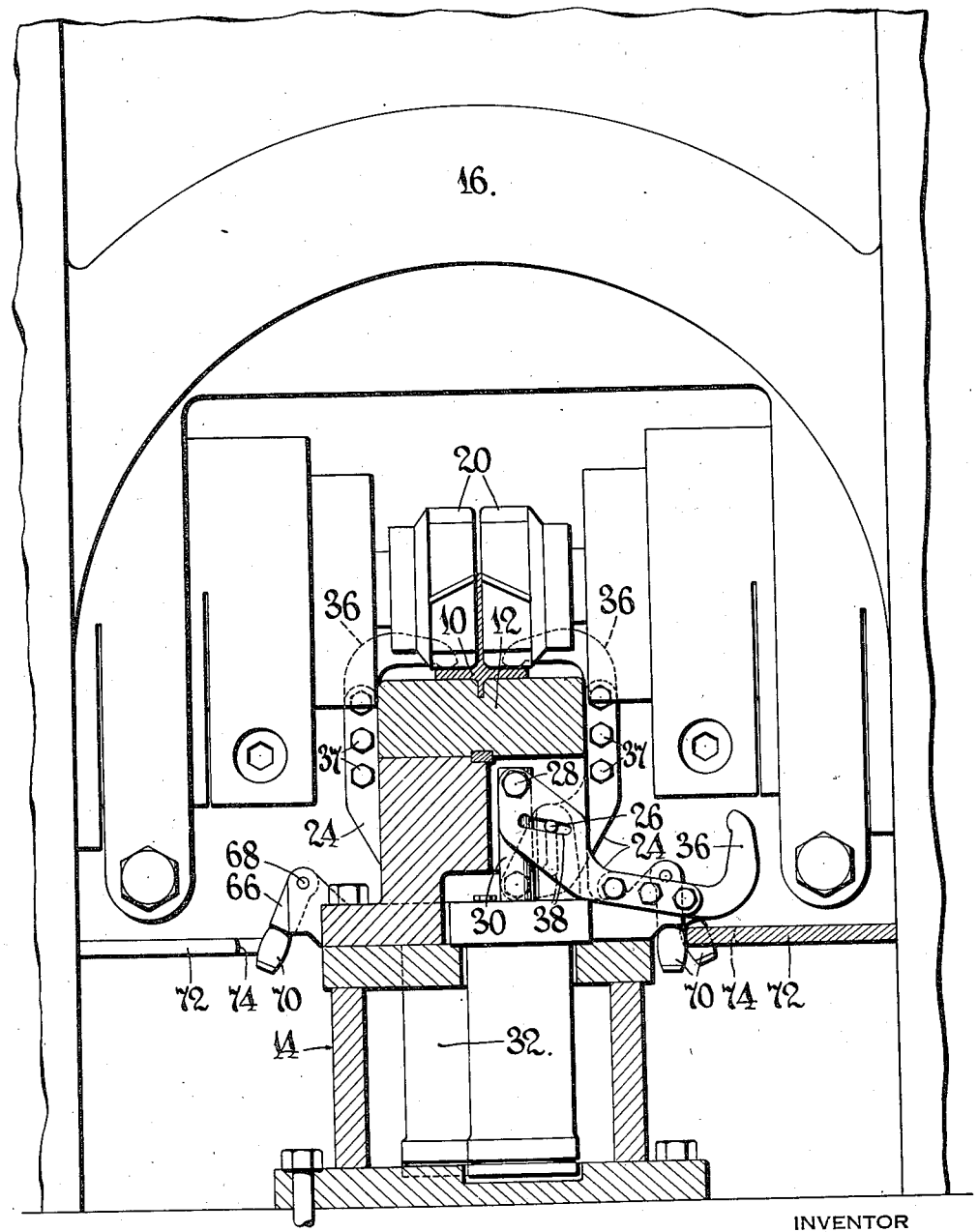
Fig. 1 is a vertical transverse section through a milling machine work support base, showing portions of the milling machine traveling head in elevation and work clamping devices of the invention in different positions of operation.

The drawings illustrate the invention arranged for use in conjunction with a milling machine of the type adapted to mill surfaces of an elongated structural element such as an airplane wing spar designated by the numeral 10 (Figs. 1 and 2). The work piece 10 is mounted upon the bed plate 12 of the machine, which in turn is illustrated as being supported upon a base designated generally by the numeral 14; the base being fabricated of metal plates and the like. A traveling cross head 16 is illustrated in Fig. 1 as carrying a pair of oppositely disposed milling cutters 20; the cross head being arranged to move longitudinally of the work piece supporting bed plate by means of any suitable form of motion transmitting mechanism (not shown).

The work piece holding mechanism comprises a plurality of independently operating clamping devices arranged alternately at opposite sides of the work piece supporting bed plate so as to extend longitudinally thereof coextensively with the work piece. The clamping devices are designated generally by the numeral 22, and each comprises a work clamping tong 24 which is in the form of a pair of spaced parallel plates pivotally and slidably mounted intermediately of their ends upon a fixed pin 26 extending from a stationary portion of the work piece supporting structure; the pivotal mounting being such as to enable the tong 24 to pivot about an axis extending longitudinally of the machine. Each tong 24 is pivotally connected at its inner end by means of a pin 28 to a corresponding piston rod 30 extending from a fluid cylinder 32.

The outer ends of the tongs 24 are provided with replaceable finger portions 36 which are fastened to the tongs by means of screws 37 and are adapted to bear downwardly upon corresponding side portions of the work piece 10 to hold the latter in operative position upon the machine bed when the piston rods 30 are in relatively retracted positions within the cylinders 32. The tong plates 24 are slotted at 38 in the region of mounting upon the pins 26 so that reciprocal movements of the piston rod 30 between relatively retracted and extended positions will cause the clamping tongs to revolve and withdraw from their erect work piece clamping positions to reclining disengaged positions as illustrated in Figs. 1 and 2.

The piston rods 30 are fitted with piston heads 40 within the cylinders 32 for actuation of the clamping devices in response to fluid pressure forces at opposite sides of the piston heads. Fluid transmission ports 42 and 44 are formed within each of the cylinder walls to transmit fluid pressure to the opposite ends of the cylinders from corresponding control valves 46 mounted within the cylinder castings (Figs. 3 and 4). The control valves 46 are of stem like form and are slidably mounted within complementarily shaped openings 48 in the cylinder castings for reciprocal sliding movement therewithin in such manner as to alternately connect a pressure fluid inlet port 50 in open communication with opposite ends of the cylinders 32. Each valve member 46 is longitudinally bored at 52 adjacent one end thereof and spaced transverse fluid ports 54 and 56 are bored laterally through the valve member into open communication with the longitudinal port 52 thereof as illustrated in Fig. 3. The port devices 42, 44, 54 and 56 are so relatively disposed that in one position of reciprocal movement of the valve member 46 the fluid inlet port 50 is in open communication with the cylinder port 42 (Fig. 3). The cylinder port 44 is permanently connected in open communication with a transverse port 58 leading into the valve bore 48. The valve member 46 is externally slotted longitudinally thereof in its outer surface as at 60 so as to connect the outer end of the transverse port 58 in open communication with a fluid outlet port 62 for relief of the fluid pressure below the piston head 40 through the cylinder port 44 when the valve 46 is in the position of Fig. 3.

When the valve member 46 is shifted from the position of Fig. 3 to the right thereof as viewed in the figure to a position wherein the transverse port 54 of the valve member 46 registers with the cylinder port 44 the incoming fluid is transmitted through the port 44 into the lower end of the cylinder to force the piston head 40 upwardly to retract the associated work clamping finger from the work piece as illustrated by the position of the clamping device in the foreground of Fig. 1. In this position of valve adjustment the valve member 46 covers the transverse port 58 but the slot 60 of the valve member connects the ports 42 and 62 in open communication with each other, thus providing for release of the fluid pressure previously existing within the space above the piston head 40 during the preceding piston extending movement of the device.

To provide for activation of the valve member 46 from the position of Fig. 3 to the position of adjustment procuring withdrawal of the clamp tong from the work piece, the valve member is arranged to extend at an end portion 64 beyond the confines of the cylinder structure for coaction with a lever 66 which is pivotally mounted at one end by means of a pin 68 to a fixed bracket portion of the machine bed. The lever 66 is provided at its opposite end with a bearing portion 70 adapted to engage a templet plate 72 carried at a corresponding side portion of the cross head at side edge portions 74 thereof which are so contoured as to provide the necessary camming of the valve members so as to actuate the clamping devices out of interfering range of the cross head as the milling head progresses longitudinally of the work piece and approaches successive of the clamping devices upon subsequent withdrawal of the template plate contact portions away from any one of the levers 66 the pressure thereof against the corresponding valve stem is released and the valve is shifted to the left as viewed in Fig. 3 by the force of the fluid pressure entering the inlet port 50 until it reaches the position illustrated in Fig. 3 wherein the direction of fluid pressure upon the piston is again reversed and the clamping device is thereby actuated into erect work piece clamping position after the traveling cross head has passed by.

A set screw 75 is mounted within each cylinder structure so as to extend into splined engagement with a grooved portion 77 of the corresponding valve member to limit the sliding movements of the valve members 46 within proper range to provide the action hereinabove described. As illustrated in Figs. 3 and 4, the cylinders 32 are conveniently formed by boring the castings from the lower ends thereof and subsequently mounting end closure caps 80 thereon by screwthreaded connection means so as to complete the cylinder enclosure. Similarly, the cylinder ports 42, 44, 58 and 62 may be provided by boring from externally of the cylinder castings and subsequently closing the outer ends of the ports by means of suitable plug devices as shown.

Thus, it will be understood that an improved form of work piece clamping mechanism is provided which is adapted to at all times maintain an elongate work piece in firmly clamped relation upon the machine bed structure; the clamping elements thereof being adapted to automatically move out of interfering range of the traveling head of the machine as it progresses longitudinally of the work piece, and to automatically return to clamping positions upon passage of the traveling head therebeyond. It will also be understood that although only one form of the invention has been shown and described in detail, it will be apparent to those skilled in the art that the invention is not so limited but that various changes may be made therein without departing from the spirit of the invention or the scope of the appended claims.

What is claimed is:

1. An automatic machine tool including a bed plate for supporting a work piece thereon, a tool element movable relative to said bed plate longitudinally of a work piece when supported thereon, a work piece holding mechanism comprising a plurality of independent work piece clamping devices arranged in spaced relation longitudinally of said bed plate and independently movable from work piece clamping positions to retracted positions out of range of said tool element when in the region thereof, and means associated with said tool element for coacting individually with said clamping devices when in the region thereof to actuate the latter toward retracted positions to prevent interference with movement of said tool element.

2. An automatic machine tool including a bed plate for supporting a work piece thereon, a tool element movable relative to said bed plate longitudinally of a work piece when supported thereon, a work piece holding mechanism comprising a plurality of independent work piece clamping devices arranged in spaced relation longitudinally of said bed plate and independently movable from work piece clamping positions to retracted positions out of range of said tool element when in the region thereof, and means associated with each of said clamping devices for coacting individually with said tool element to cause said clamping devices to be actuated separately toward retracted positions to prevent interference with movement of said tool element, said means including a fluid pressure motor controlled by valve means actuated by said tool element.

3. An automatic machine tool including a bed plate for supporting a work piece thereon, a tool element movable relative to said bed plate, a work piece holding mechanism comprising a plurality of independent work piece clamping members arranged in spaced relation longitudinally of said bed plate, each of said clamping members being movable into and out of work piece clamping position, means for actuating each of said clamping members comprising a reciprocal fluid motor device controlled by a valve disposed in communication with the pressure of said fluid, said valve being movable against the forces of said pressure to procure work piece releasing movement of said clamping member and normally urged by the force of said fluid pressure to move so as to procure work piece clamping movement of said clamping member, said tool element being adapted to move said valves against said fluid pressure.

4. An automatic machine tool including a bed plate for supporting a work piece thereon, a tool element movable relative to said bed plate longitudinally of a work piece when supported thereon, a work piece holding mechanism comprising a plurality of independent work piece clamping devices arranged in spaced relation longitudinally of said bed plate and independently movable from work piece clamping positions to retracted positions out of range of said tool element when in the region thereof, and means associated with each of said clamping devices for coacting with said tool element to cause said clamping devices to be actuated separately toward retracted positions to prevent interference with movement of said tool element, said means including a fluid pressure motor controlled by valve means coacting with said tool element to move said valve means toward clamping device retracted position, and said valve means being adapted to be actuated by fluid pressure forces to clamping extended positions upon subsequent withdrawal of said tool element from the region thereof.

5. An automatic machine tool including a bed plate for supporting a work piece thereon, a tool element movable relative to said bed plate longitudinally of a work piece when supported thereon, a work piece holding mechanism comprising a plurality of independent work piece clamping devices arranged in spaced relation longitudinally of said bed plate and independently movable from work piece clamping positions to retracted positions out of range of said tool element when in the region thereof, and means associated with said tool element for coacting individually with said clamping devices when in the region thereof to actuate the latter toward retracted positions to prevent interference with movement of said tool element, said clamping devices each comprising an axially movable push rod and a clamp element pivoted thereto and coacting cam elements associated respectively with said clamp element and said bed plate for moving said clamping element laterally over and down upon said work piece by axial movement of said push rod.

6. An automatic machine tool including a bed plate for supporting a work piece thereon, a tool element movable relative to said bed plate longitudinally of a work piece when supported thereon, a work piece holding mechanism comprising a plurality of independent work piece clamping devices arranged in spaced relation longitudinally of said bed plate and independently movable from work piece clamping positions to retracted positions out of range of said tool element when in the region thereof, said clamping devices each comprising a reciprocating fluid pressure motor having an axially movable piston rod, a clamp element pivoted to said rod, and coacting cam elements associated respectively with said clamp element and said bed plate for moving said clamping element laterally over and down upon said work piece by axial movement of said push rod.

GEORGE CARSON.